United States Patent [19]

Sakamoto et al.

[11] Patent Number: 5,462,805
[45] Date of Patent: Oct. 31, 1995

[54] FIRE-PROTECTION AND SAFETY GLASS PANEL

[75] Inventors: Akihiko Sakamoto; Tadashi Takahashi; Masayuki Ninomiya, all of Shiga, Japan

[73] Assignee: Nippon Electric Glass Co., Ltd., Otsu, Japan

[21] Appl. No.: 99,226

[22] Filed: Jul. 29, 1993

[30] Foreign Application Priority Data

Jul. 30, 1992 [JP] Japan .................................. 4-223470

[51] Int. Cl.$^6$ ................................................ B32B 9/00
[52] U.S. Cl. .................. 428/430; 428/215; 428/410; 428/426; 428/480; 428/911; 428/913; 428/920
[58] Field of Search .......................... 428/458, 432, 428/437, 141, 524, 480, 215, 412, 410, 426, 911, 913, 920; 526/87

[56] References Cited

U.S. PATENT DOCUMENTS

| | | | |
|---|---|---|---|
| 3,900,673 | 8/1975 | Mattimoe et al. | 428/339 |
| 4,358,329 | 11/1982 | Masuda | 156/106 |
| 4,382,996 | 5/1983 | Mori et al. | 428/442 |
| 4,910,074 | 3/1990 | Fukawa et al. | 428/215 |
| 4,911,984 | 3/1990 | Parker | 428/428 |
| 4,952,460 | 8/1990 | Beckmann et al. | 428/429 |
| 5,002,820 | 3/1991 | Bolton et al. | 428/215 |
| 5,091,258 | 2/1992 | Moran | 428/437 |
| 5,091,487 | 2/1992 | Hori et al. | 526/87 |
| 5,145,746 | 9/1992 | Tomoyuki | 428/458 |
| 5,219,630 | 6/1993 | Hickman | 428/38 |
| 5,230,954 | 7/1993 | Sakamoto et al. | 428/332 |

FOREIGN PATENT DOCUMENTS

| | | |
|---|---|---|
| 684017 | 7/1966 | Belgium . |
| 1905619 | 8/1970 | Germany . |
| 480276 | 12/1969 | Switzerland . |

Primary Examiner—Patrick J. Ryan
Assistant Examiner—William A. Krynski
Attorney, Agent, or Firm—Hopgood, Calimafde, Kalil & Judlowe

[57] ABSTRACT

In a fire-protection and safety glass panel having a transparent appearance and dual functions as a fire protection glass for shutting out flame and smoke for a long period of time upon occurrence of fire and as a safety glass which is neither shattered into pieces and nor forms any through hole if it is broken in an ordinary life, a PET (polyethylene terephthalate) film (12) is arranged between a first glass plate (10) and a second glass plate (11). The first and the second glass plates (10 and 11) and the PET film (12) are adhered through transparent acrylic adhesive agent layers (13 and 14), respectively. An intermediate resin layer comprises the PET film (12) and the adhesive agent layers (13 and 14) and has a thickness between 75 and 200 μm.

14 Claims, 3 Drawing Sheets

HEAT CURVE FOR FIRE-RESISTING TEST

FIRE-PROTECTION AND SAFETY GLASS PANEL

BACKGROUND OF THE INVENTION

This invention relates to a fire-protection and safety glass panel which serves as a fire-protection panel upon occurrence of fire and as a safety glass panel in an ordinary life.

With recent increase of large-sized architectures such as multistory buildings, department stores, and supermarkets, there is a demand for a fire-protection and safety glass panel having dual functions as a fire protection panel for shutting out flame and smoke upon occurrence of fire to thereby suppress the spread of the fire at a minimum and as a safety glass panel which is neither shattered into pieces and nor forms a through hole if it is broken in an ordinary life.

A conventional fire-protection panel comprises a low-expansion crystallized glass plate, a borosilicate glass plate, or a wire mesh glass plate (a wire glass plate). On the other hand, a conventional safety glass panel comprises a laminated glass plate including a plurality of soda lime glass plates and a transparent polyvinyl butyral film or films (PVB film) joined by thermocompression bonding to provide a structure which comprises a plurality of glass plates with an intermediate resin layer or layers interposed therebetween. Another conventional safety glass panel comprises a soda lime glass plate with an antishattering film applied on a surface thereof. However, a fire-protection and safety glass panel which has both a fire protection function and a safety function has not yet been known.

If the safety glass panel is heated upon occurrence of fire, it is thermally cracked to form a through hole. In particular, when the above-mentioned laminated glass plate is heated, the PVB film is decomposed to produce a combustible gas. The gas is blown to a nonheated side and inflamed to accelerate the spread of the fire. For thermocompression bonding of the transparent film, a large-sized heating furnace is required so that the laminated glass plate is completely received therein. Furthermore, when a plurality of the glass plates have different thermal expansion coefficients and the PVB film is thermocompression bonded to the glass plates to provide an intermediate resin layer therebetween, a warp is caused to occur due to the difference in contraction of the glass plates during cooling.

On the other hand, the low-expansion crystallized glass plate or the borosilicate glass plate used as the fire protection panel is easily broken due to mechanical impact in the ordinary life to be shattered into pieces or dropped off. The wire mesh glass plate has a safety effect to some extent. However, if the glass plate is subjected to a great impact, for example, due to strong collision of a human body, a wire mesh will be cut off to form a through hole. In this event, the human body may be injured.

There are known incombustible transparent films such as a fluoric resin film. However, this film is very expensive and slightly opaque. Accordingly, it is difficult to obtain a laminated glass panel having a high transparency. In addition, this film is poor in evenness. When this film is adhered to the glass plate, air bubbles easily enter into a gap formed therebetween. It is therefore difficult to obtain a transparent appearance.

SUMMARY OF THE INVENTION

It is therefore an object of this invention to provide a fire-protection and safety glass panel having dual functions as a fire-protection glass panel for shutting out flame and smoke for a long period of time on occurrence of fire and as a safety glass which is neither shattered into pieces nor forms a through hole if it is broken in an ordinary life.

It is another object of this invention to provide a fire-protection and safety glass panel of the type described, which has a transparent appearance.

It is still another object of this invention to provide a glass window comprising a fire-protection and safety glass panel having dual functions as a fire-protection glass panel for shutting out flame and smoke for a long period of time on occurrence of fire and as a safety glass panel which is neither shattered into pieces nor forms a through hole if it is broken in an ordinary life.

It is yet another object of this invention to provide a glass window of the type described, which comprises the fire-protection and safety glass panel having a transparent appearance.

It is a further object of this invention to provide a glass door comprising a fire-protection and safety glass panel having dual functions as a fire-protection glass panel for shutting out flame and smoke for a long period of time on occurrence of fire and as a safety glass panel which is neither shattered into pieces nor forms a through hole if it is broken in an ordinary life.

It is a still further object of this invention to provide a glass door of the type described, which comprises the fire-protection and safety glass panel having a transparent appearance.

Other objects of this invention will become clear as the description proceeds.

A fire-protection and safety glass panel to which this invention is applicable comprises a first glass plate, a second glass plate opposite to the first glass plate, and an intermediate resin layer between the first and the second glass plates. At least one of the first and the second glass plates is a heat-resistant glass plate.

According to this invention, the intermediate resin layer comprises a polyethylene terephthalate film and has a thickness which is not greater than 200 µm.

A glass window to which this invention is applicable comprises a fire-protection and safety glass panel and a sash for the fire-protection and safety glass panel. The fire-protection and safety glass panel comprises a first glass plate, a second glass plate opposite to the first glass plate, and an intermediate resin layer between the first and the second glass plates. At least one of the first and the second glass plates is a heat-resistant glass plate.

According to this invention, the intermediate resin layer comprises a polyethylene terephthalate film and has a thickness which is not greater than 200 µm.

A glass door to which this invention is applicable comprises a fire-protection and safety glass panel and a frame for the fire-protection and safety glass panel. The fire-protection and safety glass panel comprises a first glass plate, a second glass plate opposite to the first glass plate, and an intermediate resin layer between the first and the second glass plates. At least one of the first and the second glass plates is a heat-resistant glass plate.

According to this invention, the intermediate resin layer comprises a polyethylene terephthalate film and has a thickness which is not greater than 200 µm.

In order to achieve the above-mentioned objects, the present inventors have made extensive researches. As a result, it is found out that a material interposed in each gap between the first and the second glass plates must have a thickness not greater than a predetermined value. Even if the material is combustible or fire-retarding and the combustible gas is blown to the nonheated side, the gas is prevented from being inflamed because its density is thin.

When a heat-resistant glass plate is used as at least one of the glass plates, a fire protection effect is improved to provide a function as a fire-protection panel. Furthermore, when the polyethylene terephthalate film is used as the material interposed in each gap between the first and the second glass plates, a sufficient safety effect is obtained even if the thickness is small. This is because the tensile strength is excellent upon reception of an impact.

According to this invention, the polyethylene terephthalate film (hereinafter referred to as a PET film) is used as a material of the intermediate resin layer. This is because the film is fire-retarding and excellent in transparency and evenness. In addition, the film can be formed into an extremely small thickness, specifically, not greater than 25 µm. Furthermore, this film is excellent in strength and little in extension so that a tensile strength is high even if the thickness is small.

As the heat-resistant glass plate used in this invention, use can be made of a low-expansion crystallized glass plate, a borosilicate glass plate, or a wire glass plate. Taking the transparency and the heat resistance into consideration, the low-expansion crystallized glass plate is preferable.

The low-expansion crystallized glass plate is of a crystallized glass which exhibits thermal expansion substantially equal to zero upon occurrence of fire. Specifically, a preferable crystallized glass has a composition consisting by weight of 3–5% $Li_2O$, 20–35% $Al_2O_3$, 55–70% $SiO_2$, 1–3% $TiO_2$, 1–4% $ZrO_2$, 1–5% $P_2O_5$, 0–4% $Na_2O$, 0–4% $K_2O$, 0.5–4% $Na_2O+K_2O$, precipitates β-quartz solid solution crystals, and has a thermal expansion coefficient between $-10\times10^{-7}/°$ C. and $15\times10^{-7}/°$ C. (30°–750° C).

According to this invention, at least one of the first and the second glass plates is a heat-resistant glass plate. Each of the other glass plates does not need to be a heat-resistant glass plate but may be a soda lime glass plate.

When the borosilicate glass plate or the soda lime glass plate is used in this invention, it is preferable to chemically or thermally reinforce the glass plate in order to improve the impact resistance.

The transparent adhesive agent used in this invention may be any appropriate material which is available at a low cost, excellent in transparency, and strong in adhesion so that a large-sized glass plate and the PET film can be strongly bonded. At present, only combustible and fire-retarding materials satisfy all of the above-mentioned properties. Taking a material cost and a workability into consideration, acrylic or vinyl transparent adhesive agents are preferable.

In order to prevent air bubbles from entering into a gap between the glass plate and the intermediate resin layer as little as possible, it is preferable to use a glass plate having a surface undulation not greater than 2 microns and to suppress a surface undulation of a transparent adhesive agent coated on the PET film to a value not greater than 2 microns.

According to this invention, at least one glass plate comprises a heat-resistant glass plate. When the glass plate is heated upon occurrence of fire, no through hole allowing passage of flame and smoke is formed during a predetermined period of time so that the spread of the fire can be avoided.

According to this invention, it is sufficient that at least one glass plate is a heat-resistant glass plate. Each of the other glass plates does not need to be a heat-resistant glass plate but may be a soda lime glass plate.

According to this invention, each intermediate resin layer desirably has a thickness not greater than 200 µm, preferably, not greater than 100 µm. The reasons are as follows.

The first reason will be described. When the fire-protection and safety glass panel according to this invention is heated upon occurrence of fire, the PET film and the transparent adhesive agent forming the intermediate layer are decomposed to produce the combustible gas. If the intermediate resin layer has a thickness not smaller than 200 µm, a large amount of the combustible gas is produced so that the high-density gas is blown to the nonheated side. The gas will be inflamed by the heat of the fire to thereby spread the fire.

The second reason is as follows. When the fire-protection and safety glass panel according to this invention is heated upon occurrence of fire and the intermediate resin layer has a thickness not smaller than 200 µm, a large amount of the combustible gas will be produced as described above. This increases a pressure in the gap between the glass plates. Due to the pressure, the glass plate is easily broken.

The PET film is excellent in strength and little in extension. Accordingly, even if the thickness is small, the fire-protection and safety glass panel according to this invention has an excellent tensile strength. When the glass panel is subjected to an impact, deformation of the glass plate is suppressed and a high impact resistance is obtained.

DESCRIPTION OF THE PREFERRED EMBODIMENT

Figure 1:
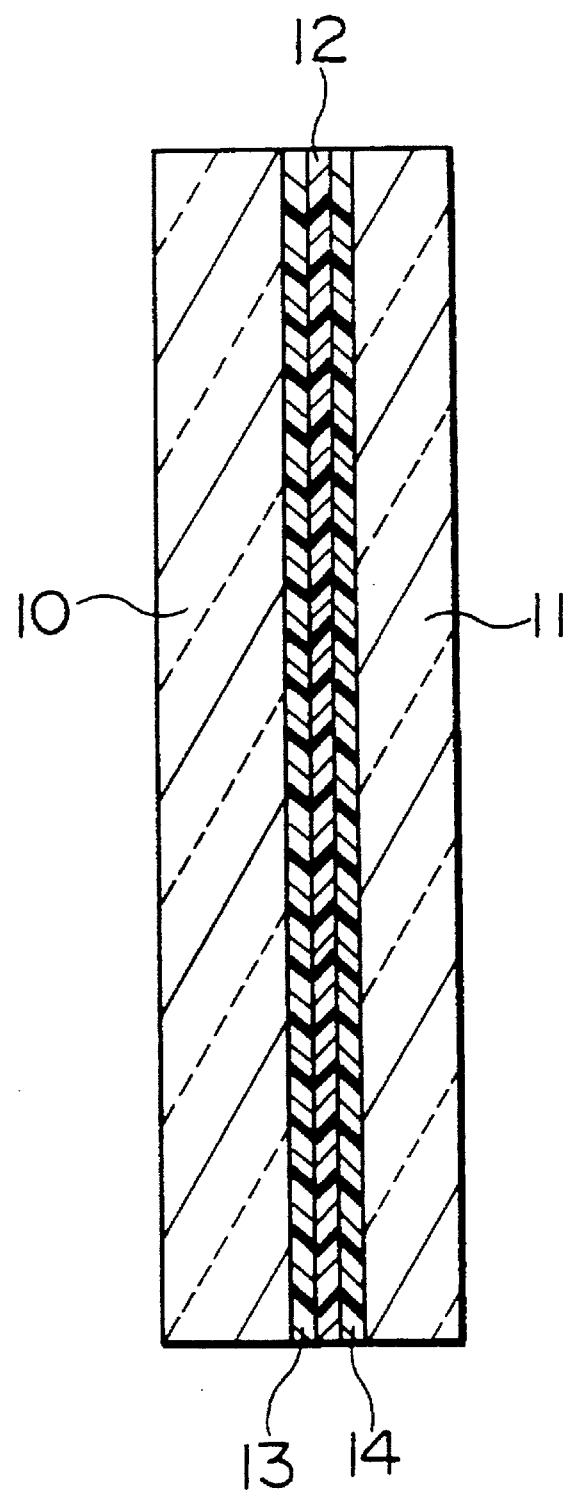
FIG. 1 is a sectional view of a fire-protection and safety glass panel according to an embodiment of this invention.

Referring to FIG. 1, a fire-protection and safety glass panel according to a preferred embodiment of this invention comprises a first glass plate 10, a second glass plate 11 opposite to the first glass plate, and an intermediate resin layer between the first and the second glass plates 10 and 11. At least one of the first and the second glass plates 10 and 11 is a heat-resistant glass plate. The intermediate resin layer comprises a polyethylene terephthalate film (namely, a PET film) 12 and first and second adhesive agent layers 13 and 14 and has a thickness which is not greater than 200 µm. The first adhesive agent layer 13 adheres the PET film 12 to the first glass plate 10. The second adhesive agent layer 14 adheres the PET film 12 to the second glass plate 11.

Each of the first and the second adhesive agent layers 13 and 14 is of either a silicone adhesive agent or an acrylic adhesive agent.

Each of the first and the second glass plates 10 and 11 is a transparent plate. The PET film 12 is a transparent film. Each of the first and the second adhesive agent layers 13 and 14 is a transparent layer.

The heat-resistant glass plate is of either a low-expansion crystallized glass described above or a borosilicate glass. Alternatively, the heat-resistant glass plate is of a wire glass.

Table 1 shows structures and characteristics of this invention (Samples Nos. 1–3) and comparative examples (Samples Nos. 4–6).

The samples Nos. 1–5 in Table 1 have a structure illustrated in FIG. 1. The PET film 12 is held between the first glass plate 10 and the second glass plate 11. The glass plates 10 and 11 are adhered to the PET film 12 through transparent acrylic adhesive agent layers 13 and 14, respectively. Each of the samples Nos. 1–3 has the intermediate resin layer having a thickness of 75–200 μm while the samples Nos. 4 and 5 have intermediate resin layers having thicknesses of 200 μm and 250 μm, respectively.

Each of the samples Nos. 1–5 was prepared in a method which will presently be described.

At first, the transparent adhesive agent layer 13 was applied on one surface of the PET film 12. The adhesive-applied surface was brought into contact with one surface of the first glass plate 10. One ends thereof were inserted in a gap between two rubber rollers and then moved forward so that they were bonded together.

TABLE 1

|  | This Invention | | | Comparative Example | | |
| --- | --- | --- | --- | --- | --- | --- |
|  | No. 1 | No. 2 | No. 3 | No. 4 | No. 5 | No. 6 |
| Glass Plate A | Crystallized Glass | Crystallized Glass | Crystallized Glass | Soda Lime Glass | Crystallized Glass | Borosilicate Glass |
| Glass Plate B | Soda Lime Glass | Soda Lime Glass | Borosilicate Glass | Soda Lime Glass | Borosilicate Glass | Soda Lime Glass |
| Transparent Film | PET | PET | PET | PET | PET | PVB |
| Thickness of Transparent Film (μm) | 25 | 50 | 100 | 100 | 200 | 300 |
| Transparent Adhesive Agent | Acrylic | Acrylic | Acrylic | Acrylic | Acrylic | — |
| Thickness of Adhesive Agent (μm) | 25 | 25 | 50 | 50 | 25 | — |
| Thickness of Intermediate Resin Layer (μm) | 75 | 100 | 200 | 200 | 250 | — |
| Appearance | Transparent | Transparent | Transparent | Transparent | Transparent | Transparent |
| Inflammation | None | None | Self-extinquish | Not Measured | Not Measured | Not Measured |
| Fire Protection Time (minutes) | >180 | >180 | >180 | 17 | 22 | 6 |
| Impact Resistance (cm) | 72 | 120 | 140 | 140 | 140 | 100 |
| Warp (%) | <0.2 | <0.2 | <0.2 | <0.2 | <0.2 | 1.5 |

Thereafter, the transparent adhesive agent layer 14 was applied on the other surface of the PET film 12. The adhesive-applied surface was brought into contact with one surface of the second glass plate 11. In the manner similar to the foregoing, they were bonded together.

The sample No. 6 has a structure comprising a borosilicate glass plate and a soda lime glass plate with a PVB film thermocompression bonded therebetween.

As the crystallized glass plate in the table, use was made of a transparent crystallized glass having a dimension of 2000×900×5 mm and a thermal expansion coefficient of −5×10$^{-7}$/° C. (FIRELITE (trade name): manufactured by Nippon Electric Glass Co., Ltd.). As the soda lime glass plate, use was made of a glass plate formed into a plate shape by an ordinary float method and having a dimension of 2000×900×3 mm and a thermal expansion coefficient of 85×10$^{-7}$/° C. As the borosilicate glass, use was made of a glass plate formed into a plate shape by an ordinary down draw method and having a dimension of 2000×900×3 mm and a thermal expansion coefficient of 30×10$^{-7}$/° C.

As is obvious from the table, each of the samples Nos. 1–3 according to this invention had a transparent appearance. In a fire protection test, no inflammation was caused at the nonheated side or, if the inflammation was caused, it was immediately self-extinguished. In addition, the fire protection time was as long as 180 minutes or more. The impact resistance was excellent and the warp was small.

On the other hand, each of the samples Nos. 4, 5, and 6 had a transparent appearance and an excellent impact resistance. However, in the sample No. 4 using no heat-resistant glass plate, each glass plate was broken in the fire protection test to form through holes allowing passage of flame and smoke. With the samples Nos. 5 and 6, the gas was blown to the nonheated surface and spontaneously inflamed in the fire protection test so that the fire protection time was as small as 6–22 minutes. It was therefore unnecessary to test the inflammation for each comparative example. The samples Nos. 4 and 5 exhibited a small warp while the sample 6 exhibited a warp as large as 1.5%.

In the table, the appearance was visually observed.

Figure 4:
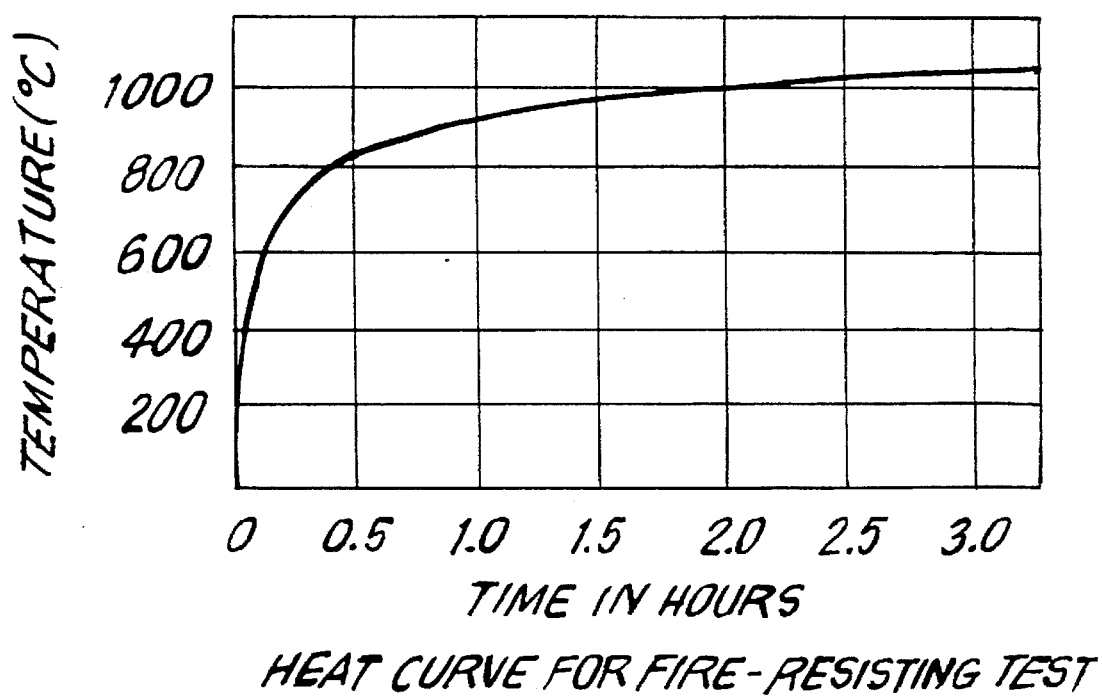
FIG. 4 is illustrative of a standard heating curve as prescribed in the Official Notification No. 1125 of the Ministry of Construction in Japan.

The inflammation was measured as follows. Each sample was located with one surface faced to an electric heater of an area heating type. Heating was carried out in accordance with a standard heating curve illustrated in FIG. 4 as prescribed in Official Notification No. 1125 of the Ministry of Construction of Japan. After the lapse of three minutes from the start of heating, a gas lighter was occasionally brought close to the gas blown to the nonheated side while it was observed whether or not the inflammation was caused to occur. In case when the gas lighter was inflamed, "none" is indicated. In case when the gas lighter was inflamed but no flame was produced on the nonheated side of the sample after the gas lighter was separated apart from the sample, "self-extinguish" is indicated.

Japanese Notification No. 1125, which was effective as of Jun. 30, 1990, relates to the certification of fire doors constructed to have fire prevention properties.

The testing method is carried out generally on specimens of size and thickness substantially the same as the actual product. The specimen is dried in dry air. Both surfaces of the fire door, depending on the type, are heated in a furnace for a time ranging from about 20 to 60 minutes, the temperature being measured by a chromel/alumel thermocouple, at least 9 thermojunctions being used to measure the heating temperature, the thermojunctions being uniformly spaced on the heating surface.

A successful test is one in which the specimen does not generate flames or form heating gaps or cracks when the backside of the surface is exposed to heat. In addition, an acceptable specimen should not generate smoke from the back side of the heated surface, etc.

After heating, a successful specimen should not exhibit physical damage, exfoliation detachment from the framework, etc.

The fire protection time was measured by subjecting each sample to the fire protection test twice wherein each surface was faced to a heating source. The time was measured until spontaneous inflammation was caused to occur at the non-heated side of the sample or until the through hole allowing passage of flame or smoke was formed. A shorter one was selected for indication.

The impact resistance was examined in accordance with a shot bag test carried out in the following manner. Each sample was vertically fixed. In order to give an impact, a shot bag was made to collide with one surface of the sample with a gradual increase of a falling level. A maximum falling level H was determined at which no through hole was formed in the sample after reception of the impact and a total weight of a dropping part of the glass plate was not greater than 50 g. It is understood that the impact resistance is excellent when the falling level H is high.

The warp was measured by vertically arranging each sample and horizontally putting a straight ruler therealong. Indication is made at a percentage with respect to a horizontal length.

Although the above-mentioned embodiment is directed to the fire-protection and safety glass panel comprising the first and the second glass plates, this invention is not restricted thereto but is also applicable to a fire-protection and safety glass panel comprising three or more glass plates and two or more intermediate resin layers. In this case, each intermediate resin layer is disposed between adjacent ones of the glass plates.

As described above, the fire-protection and safety glass according to this invention has a transparent appearance and has dual functions as a fire-protection glass for shutting out flame and smoke during a long period of time upon occurrence of fire and as a safety glass which is neither shattered into pieces nor forms any through hole if it is broken in an ordinary life.

Figure 2:
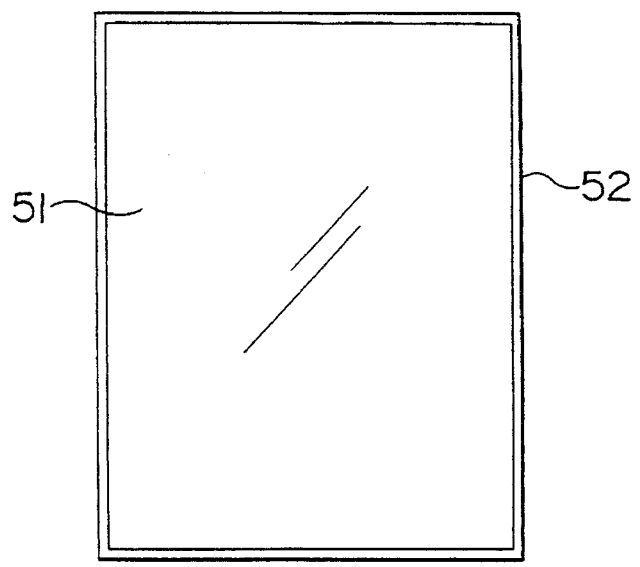
FIG. 2 is a front view of a glass window using the fire-protection and safety glass panel illustrated in FIG. 1.

Turning to FIG. 2, a glass window comprises a fire-protection and safety glass panel 51 and a sash 52 for the fire-protection and safety glass panel 51. As the fire-protection and safety glass panel 51, the fire-protection and safety glass panel described in conjunction with FIG. 1 is used so that the window is a fire-protection and safety glass window.

Figure 3:
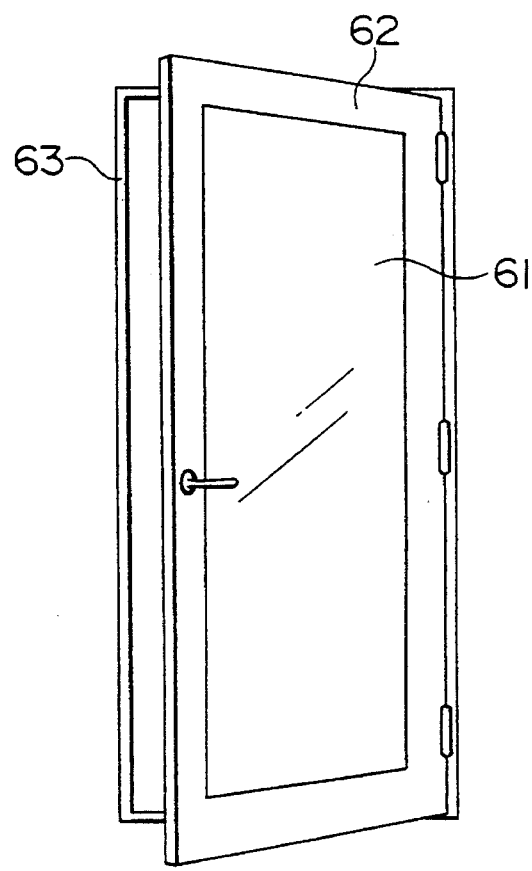
FIG. 3 is a perspective view of a glass door using the fire-protection and safety glass panel illustrated in FIG. 1.

Turning to FIG. 3, a glass door comprises a fire-protection and safety glass panel 61 and a frame 62 for the fire-protection and safety glass panel 61. The fire-protection and safety glass panel of FIG. 1 is used as the fire-protection and safety glass panel 61 so that the door is a fire-protection and safety glass door. The glass door is installed in an opening 63.

What is claimed is:

1. A fire-protection and safety glass panel comprising a first glass plate, a second glass plate opposite to said first glass plate, and an intermediate resin layer between said first and said second glass plates, at least one of said first and said second glass plates being a low-expansion crystallized glass plate of a low-expansion crystallized glass, wherein said intermediate resin layer comprises a polyethylene terephthalate film, a first adhesive agent layer for adhering said polyethylene terephthalate film to said first glass plate, and a second adhesive agent layer for adhering said polyethylene terephthalate film to said second glass plate, said intermediate resin layer having a thickness which is not greater than 200 μm.

2. A fire-protection and safety glass panel as claimed in claim 1, wherein each of said first and said second adhesive agent layers is of an adhesive agent selected from a group consisting of a silicone adhesive agent and an acrylic adhesive agent.

3. A fire-protection and safety glass panel as claimed in claim 1, wherein each of said first and said second glass plates is a transparent plate, said polyethylene terephthalate film being a transparent film, each of said first and said second adhesive agent layers being a transparent layer.

4. A fire-protection and safety glass panel as claimed in claim 1, wherein said low expansion crystallized glass consists essentially of 3–5 wt % $Li_2O$, 20–35 wt % $Al_2O_3$, 55–70 wt % $SiO_2$, 1–3 wt % $TiO_2$, 1–4 wt % $ZrO_2$, 1–5 wt % $P_2O_5$, 0–4 wt % $Na_2O$ and 0–4 wt % $K_2O$, where a total amount of $Na_2O$ and $K_2O$ is 0.5–4 wt %, said low-expansion crystallized glass containing β-quartz solid solution crystals.

5. A glass window comprising a fire-protection and safety glass panel and a sash for said fire-protection and safety glass panel, said fire-protection and safety glass panel comprising a first glass plate, a second glass plate opposite to said first glass plate, and an intermediate resin layer between said first and said second glass plates, at least one of said first and said second glass plates being a low-expansion crystallized glass plate of a low-expansion crystallized glass, wherein said intermediate resin layer comprises a polyethylene terephthalate film, a first adhesive agent layer for adhering said polyethylene terephthalate film to said first glass plate, and a second adhesive agent layer for adhering said polyethylene terephthalate film to said second glass plate, said intermediate resin layer having a thickness which is not greater than 200 μm.

6. A glass window as claimed in claim 5, wherein each of said first and said second glass plates is a transparent plate, said polyethylene terephthalate film being a transparent film, each of said first and said second adhesive agent layers being a transparent layer.

7. A glass door comprising a fire-protection and safety glass panel and a frame for said fire-protection and safety glass panel said fire-protection and safety glass panel comprising a first glass plate, a second glass plate opposite to said first glass plate, and an intermediate resin layer between said first and said second glass plates, at least one of said first and said second glass plates being a low-expansion crystallized glass plate of a low-expansion crystallized glass, wherein said intermediate resin layer comprises a polyethylene terephthalate film, a first adhesive agent layer for adhering said polyethylene terephthalate film to said first plate, and a second adhesive agent layer for adhering said polyethylene terephthalate film to said second glass plate, said intermediate resin layer having a thickness which is not greater than 200 μm.

8. A glass door as claimed in claim 7, wherein each of said first and said second glass plates is a transparent plate, said polyethylene terephthalate film being a transparent film, each of said first and said second adhesive agent layers being a transparent layer.

9. A fire-protection and safety glass panel comprising a plurality of glass plates and an intermediate resin layer between adjacent ones of said plurality of glass plates, at least one of said plurality of glass plates being a low-expansion crystallized glass plate of a low-expansion crystallized glass, wherein said intermediate resin layer comprises a polyethylene terephthalate film, a first adhesive agent layer for adhering said polyethylene terephthalate film to one of said adjacent ones of said plurality of glass plates, and a second adhesive agent layer for adhering said polyethylene terephthalate film to the other of said adjacent ones of said plurality of glass plates, said intermediate resin layer having a thickness which is not greater than 200 μm.

10. A fire-protection and safety glass panel as claimed in claim 9, wherein each of said plurality of glass plates is a transparent plate, said polyethylene terephthalate film being a transparent film, each of said first and said second adhesive agent layers being a transparent layer.

11. A glass window comprising a fire-protection and safety glass panel and a sash for said fire-protection and safety glass panel, said fire-protection and safety glass panel comprising a plurality of glass plates and an intermediate resin layer between adjacent ones of said plurality of glass plates, at least one of said plurality of glass plates being a low-expansion crystallized glass plate of a low-expansion crystallized glass, wherein said intermediate resin layer comprises a polyethylene terephthalate film, a first adhesive agent layer for adhering said polyethylene terephthalate film to one of said adjacent ones of said plurality of glass plates, and a second adhesive agent layer for adhering said polyethylene terephthalate film to the other of said adjacent ones of said plurality of glass plates, said intermediate resin layer having a thickness which is not greater than 200 μm.

12. A glass window as claimed in claim 11, wherein each of said plurality of glass plates is a transparent plate, said polyethylene terephthalate film being a transparent film, each of said first and said second adhesive agent layers being a transparent layer.

13. A glass door comprising a fire-protection and safety glass panel and a frame for said fire-protection and safety glass panel, said fire-protection and safety glass panel comprising a plurality of glass plates and an intermediate resin layer between adjacent ones of said plurality of glass plates, at least one of said plurality of glass plates being a low-expansion crystallized glass plate of a low-expansion crystallized glass, wherein said intermediate resin layer comprises a polyethylene terephthalate film, a first adhesive agent layer for adhering said polyethylene terephthalate film to one of said adjacent ones of said plurality of glass plates, and a second adhesive agent layer for adhering said polyethylene terephthalate film to the other of said adjacent ones of said plurality of glass plates, said intermediate resin layer having a thickness which is not greater than 200 μm.

14. A glass door as claimed in claim 13, wherein each of said plurality of glass plates is a transparent plate, said polyethylene terephthalate film being a transparent film, each of said first and said second adhesive agent layers being a transparent layer.

* * * * *